(12) United States Patent
Cho et al.

(10) Patent No.: US 10,583,777 B2
(45) Date of Patent: Mar. 10, 2020

(54) SOFT UPPER TRIM FOR SWITCH ASSEMBLY OF VEHICLE DOOR AND METHOD OF MANUFACTURING THE SAME

(71) Applicants: SEOYON E-HWA CO., LTD., Seoul (KR); SEOYON AMERICA CORPORATION, Auburn Hills, MI (US)

(72) Inventors: Ji Hyun Cho, Cheonan-si (KR); Dong Suk Kim, Asan-si (KR); Jong Kyu Kim, Cheonan-si (KR)

(73) Assignees: SEOYON E-HWA CO., LTD., Seoul (KR); SEOYON AMERICA CORPORATION, Auburn Hills, MI (US)

( * ) Notice: Subject to any disclaimer, the term of this patent is extended or adjusted under 35 U.S.C. 154(b) by 0 days.

(21) Appl. No.: 16/185,540

(22) Filed: Nov. 9, 2018

(65) Prior Publication Data
US 2019/0275932 A1 Sep. 12, 2019

(30) Foreign Application Priority Data
Mar. 9, 2018 (KR) .................. 10-2018-0027755

(51) Int. Cl.
*B60Q 3/217* (2017.01)
*B60Q 3/64* (2017.01)
(Continued)

(52) U.S. Cl.
CPC .............. *B60Q 3/217* (2017.02); *B60Q 3/64* (2017.02); *B60R 13/0243* (2013.01); *G02B 6/006* (2013.01); *G02B 6/0035* (2013.01); *G02B 6/0065* (2013.01); *G02B 6/0088* (2013.01); *H01H 9/161* (2013.01); *B29C 69/00* (2013.01);
(Continued)

(58) Field of Classification Search
CPC ...... B60Q 3/217; B60Q 3/64; B60Q 2500/10; G02B 6/006; G02B 6/0088; G02B 6/0065; G02B 6/0035; B60R 13/0243; B60R 2013/0287; H01H 9/161; H01H 2229/044; H01H 2229/056; H01H 2219/056; H01H 2229/02; H01H 2219/062; B29C 69/00;
(Continued)

(56) References Cited

U.S. PATENT DOCUMENTS 6,371,548 B1 *  4/2002  Misaras .................. B60R 13/02
                                                       296/146.7
6,652,128 B2 * 11/2003  Misaras ................. B60K 37/06
                                                       362/488
(Continued)

FOREIGN PATENT DOCUMENTS

JP          4218660         2/2009
KR          101087875      11/2011
KR         20170074740      6/2017

*Primary Examiner* — Peggy A Neils
(74) *Attorney, Agent, or Firm* — Cantor Colburn LLP

(57) ABSTRACT

Provided is a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

3 Claims, 4 Drawing Sheets

(51) Int. Cl.
  *B60R 13/02* (2006.01)
  *F21V 8/00* (2006.01)
  *H01H 9/16* (2006.01)
  *B29C 69/00* (2006.01)
  *B29K 23/00* (2006.01)
  *B29L 31/30* (2006.01)

(52) U.S. Cl.
  CPC ... *B29K 2023/12* (2013.01); *B29L 2031/3041* (2013.01); *B60Q 2500/10* (2013.01); *B60R 2013/0287* (2013.01); *H01H 2219/056* (2013.01); *H01H 2219/062* (2013.01); *H01H 2229/02* (2013.01); *H01H 2229/044* (2013.01); *H01H 2229/056* (2013.01)

(58) Field of Classification Search
  CPC ................ B29C 48/00; B29K 2023/12; B29L 2031/3041
  See application file for complete search history.

(56) References Cited

U.S. PATENT DOCUMENTS

| | | | |
|---|---|---|---|
| 7,976,659 B2* | 7/2011 | Dutouquet | B29C 33/0033 156/245 |
| 10,279,512 B2* | 5/2019 | Preisler | B32B 5/18 |
| 2008/0203755 A1* | 8/2008 | Bourgeois-Jacquet | B60K 37/00 296/97.5 |
| 2011/0157906 A1* | 6/2011 | Oeuvrard | B60R 13/02 362/488 |

\* cited by examiner

SOFT UPPER TRIM FOR SWITCH ASSEMBLY OF VEHICLE DOOR AND METHOD OF MANUFACTURING THE SAME

BACKGROUND

1. Technical Field

The present invention relates to a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

2. Description of Related Art

A foamed skin trim 70 (see FIG. 1) at a door upper trim side for a vehicle is disclosed in the patent document (Korean Patent Registration No. 10-1087875).

A substrate for a door trim of a vehicle is divided into an injection-molded upper substrate, a center substrate, and a lower substrate. The three divided substrates are connected through screws or the like.

In addition, a foam-molded foam 50 and a transparent skin 60 are further laminated on the upper substrate 20 (see FIG. 1).

The foam 50 provides a cushioning sensation, and the transparent skin 60 provides a luxurious feeling, such as a leather feeling.

On the other hand, in the patent document (Japanese Patent Publication No. 4218660), as illustrated in FIGS. 2 and 3, when a driver puts a hand near a driving seat, operating symbols are displayed on a decorative panel 14, and the driver presses a desired operating symbol to operate.

That is, a switch device 10 configured to display a symbol is a hidden switch type which is embedded in a substrate of a door trim of a vehicle.

The hidden switch device 10 has a structure which is embedded only in a hard substrate. In particular, the hidden switch device 10 is embedded to be disposed between an upper portion and a lower portion of a lower trim.

Therefore, drivers who get out of the vehicle may not check a symbol inside the vehicle through a window.

In particular, after a door is locked or unlocked, when drivers get out of the vehicle, the drivers tend to check the symbol through the window, but such a demand may not be satisfied.

Above all, when the conventional switch device 10 is mounted on an upper trim, holes, into which the switch device 10 is to be inserted, should be formed in the transparent skin 60 and the foam 50, and after the switch is mounted, a finishing treatment should be performed with the transparent skin 60. However, the finishing treatment is postprocessed and thus may not attractive and likely to drop a price of the vehicle.

Due to the possibility of damage of the transparent skin 60, the conventional hidden switch device 10 has been embedded in a hard substrate as illustrated in FIGS. 2 and 3.

Meanwhile, in the patent document (Korean Patent Laid-Open Publication No. 10-2017-0074740), since a switch is provided on a substrate, the same problem arises similarly to the patent document (Japanese Patent Publication No. 4218660).

PRIOR-ART DOCUMENTS

Patent Documents (Patent Document 1) Korean Patent Registration No. 10-1087875

(Patent Document 2) Japanese Patent Publication No. 4218660

(Patent Document 3) Korean Patent Laid-Open Publication No. 10-2017-0074740

SUMMARY

1. Technical Problem

The present invention has been made to solve the above-mentioned problems, and a technical objective of the present invention is to provide a soft door trim for switch assembly of a vehicle, which is capable of displaying symbols on a transparent skin on an upper door trim thereof without damaging the transparent skin, and a method of manufacturing the same.

2. Solution to Problem

In order to achieve the above objects, according to an embodiment of the present invention, a method of manufacturing a soft upper trim for switch assembly of a vehicle door includes: (a) injection-molding an upper substrate in which a first through-hole is formed, wherein a switch module is disposed in the first through-hole; (b) applying an adhesive on an upper surface of the upper substrate; (c) vacuum-pressing a needle-punched porous foam on the upper surface of the upper substrate, on which the adhesive is applied; (d) cutting the porous foam corresponding to the first through-hole to form a second through-hole into which a light guide plate is inserted, wherein the light guide plate has an upper surface in which a symbol is engraved and a lower surface to which the switch module is assembled; (e) disposing the light guide to be inserted into the second through-hole through the first through-hole, wherein an upper surface of the porous foam is disposed at the same level as an upper surface of the light guide plate; and (f) vacuum-pressing a transparent skin on the upper surface of the porous foam and the upper surface of the light guide plate in an in-mold grain mold, wherein the transparent skin has a lower surface applied with an adhesive.

According to an embodiment of the present invention, a method of manufacturing a soft upper trim for switch assembly of a vehicle door includes: (a) injection-molding an upper substrate in which a first through-hole is formed, wherein a switch module is disposed in the first through-hole; (b) vacuum-pressing a needle-punched porous foam on an upper surface of the upper substrate in a vacuum mold, wherein the porous foam has a lower surface applied with an adhesive; (c) cutting the porous foam corresponding to the first through-hole to form a second through-hole into which a light guide plate is inserted, wherein the light guide plate has an upper surface in which a symbol is engraved and a lower surface to which the switch module is assembled; (d) disposing the light guide plate to be inserted into the second through-hole through the first through-hole, wherein an upper surface of the porous foam is disposed at the same level as an upper surface of the light guide plate; and (e) vacuum-pressing a transparent skin on the upper surface of the porous foam and the upper surface of the light guide plate in an in-mold grain mold, wherein the transparent skin has a lower surface applied with an adhesive.

According to an embodiment of the present invention, a soft upper trim for switch assembly of a vehicle door includes an upper substrate, foam, and a transparent skin, which are laminated, wherein the upper substrate has a first through-hole vertically formed therein, in which a switch module is disposed, the foam is a needle-punched porous foam and has a second through-hole formed in a position corresponding to the first through-hole, a light guide plate is inserted into the second through-hole, wherein a symbol is engraved in an upper surface of the light guide plate and an upper surface of the porous foam is disposed at the same level as the upper surface of the light guide plate, and the transparent skin is attached to the upper surface of the porous foam and the upper surface of the light guide plate.

According to an embodiment of the present invention, the light guide plate includes side plates, an upper plate which connects upper surfaces of the side plates and has the symbol engraved therein, and flanges which are formed at lower sides of the side plates and are caught on a latch stepped portion of the first through-hole, and an accommodation groove, in which the switch module is inserted and accommodated, is formed inside a lower side of the light guide plate.

3. Advantageous Effects

The present invention has the following effects.

Since a transparent skin is laminated on upper surfaces of a porous foam and a light guide plate after a first through-hole, in which a switch module is disposed, is formed in an upper substrate, continuity of a conventional transparent skin is maintained to secure both of a hidden property of the switch module and smoothness of the transparent skin, thereby providing an excellent external appearance.

In particular, since symbols are displayed on an upper substrate at a specific position close to a window, it is possible to check the symbols in the inside of a vehicle as well as through the window from the outside of the vehicle. In particular, it is possible to check whether a door is properly locked (when symbols are formed on a center substrate or a lower substrate, it is difficult or impossible for a driver to check the symbols inside or outside the vehicle).

A transparent skin and foam are separately molded, and when the transparent skin is molded, the foam is needle-punched so as to secure air-permeability of an upper substrate to which the foam is pressed and attached, and thus it is possible to prevent air from filling between the transparent skin and the foam when in-mold grain (IMG) molding (vertical vacuum press molding) is performed.

Since an accommodation groove, in which a switch module is accommodated, is formed in a center of a lower surface of a light guide plate, a thickness of an upper plate of the light guide plate is reduced by a thickness of the accommodation groove so that transmissivity can be highly improved and thus clearness of symbols can further be improved, and the accommodation groove can function to fix the assembled switch module.

Figure 1:
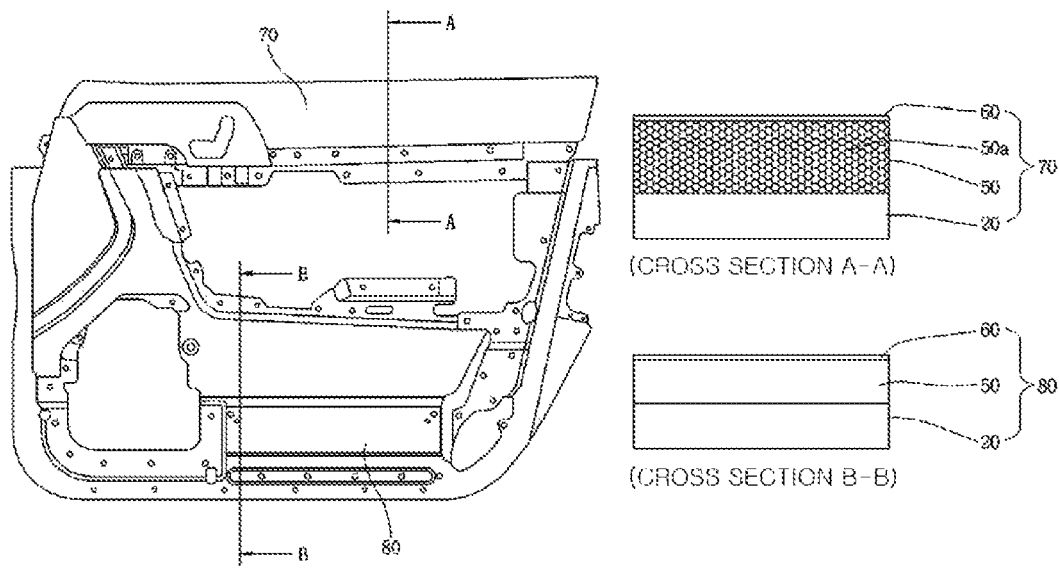
FIG. 1 illustrates a view of a conventional soft door trim for a vehicle and cross-sectional views of upper and lower trims thereof.
Figure 2:
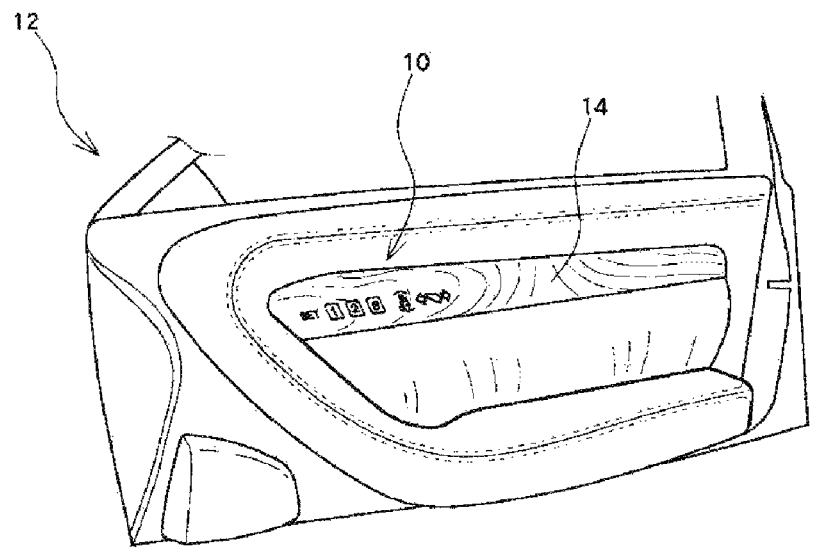
FIGS. 2 and 3 are diagrams illustrating an interior of a front seat door provided with a conventional switch device for a vehicle and illustrating states in which symbols of the switch device are displayed and not displayed.
Figure 3:
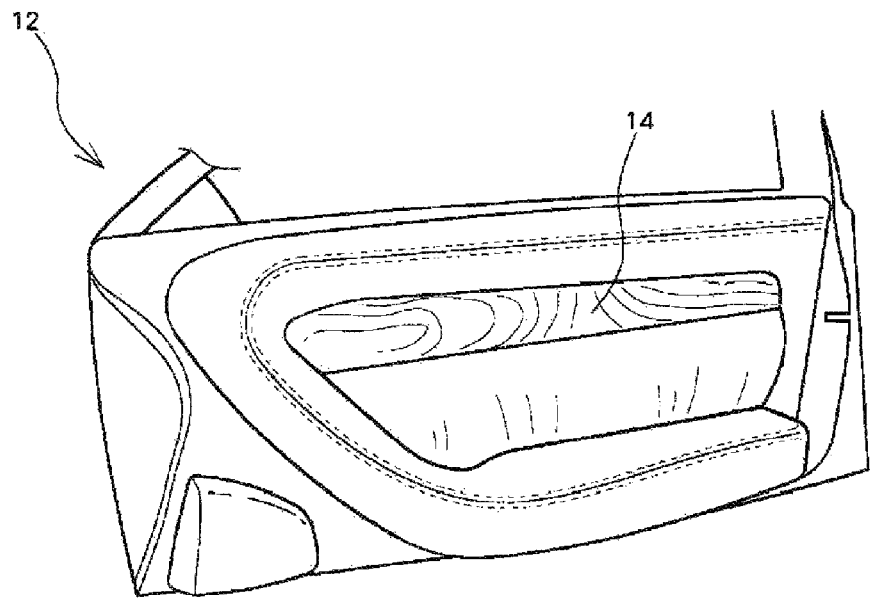

| 100: soft upper trim for switch assembly of a vehicle door | |
|---|---|
| 1: switch module | 3: switch |
| 5: bezel | 200: upper substrate |
| 210: first through-hole | 300: light guide plate |
| 305: accommodation groove | 315: lock/unlock symbols |
| 400: porous foam | 450: second through-hole |
| 500: transparent skin | 600: adhesive |

DETAILED DESCRIPTION OF EMBODIMENTS

Hereinafter, exemplary embodiments of the present invention will be described in detail with reference to the accompanying drawings. The same reference numerals will be given to the same parts as conventional parts, and detailed description thereof will be omitted.

Figure 4:
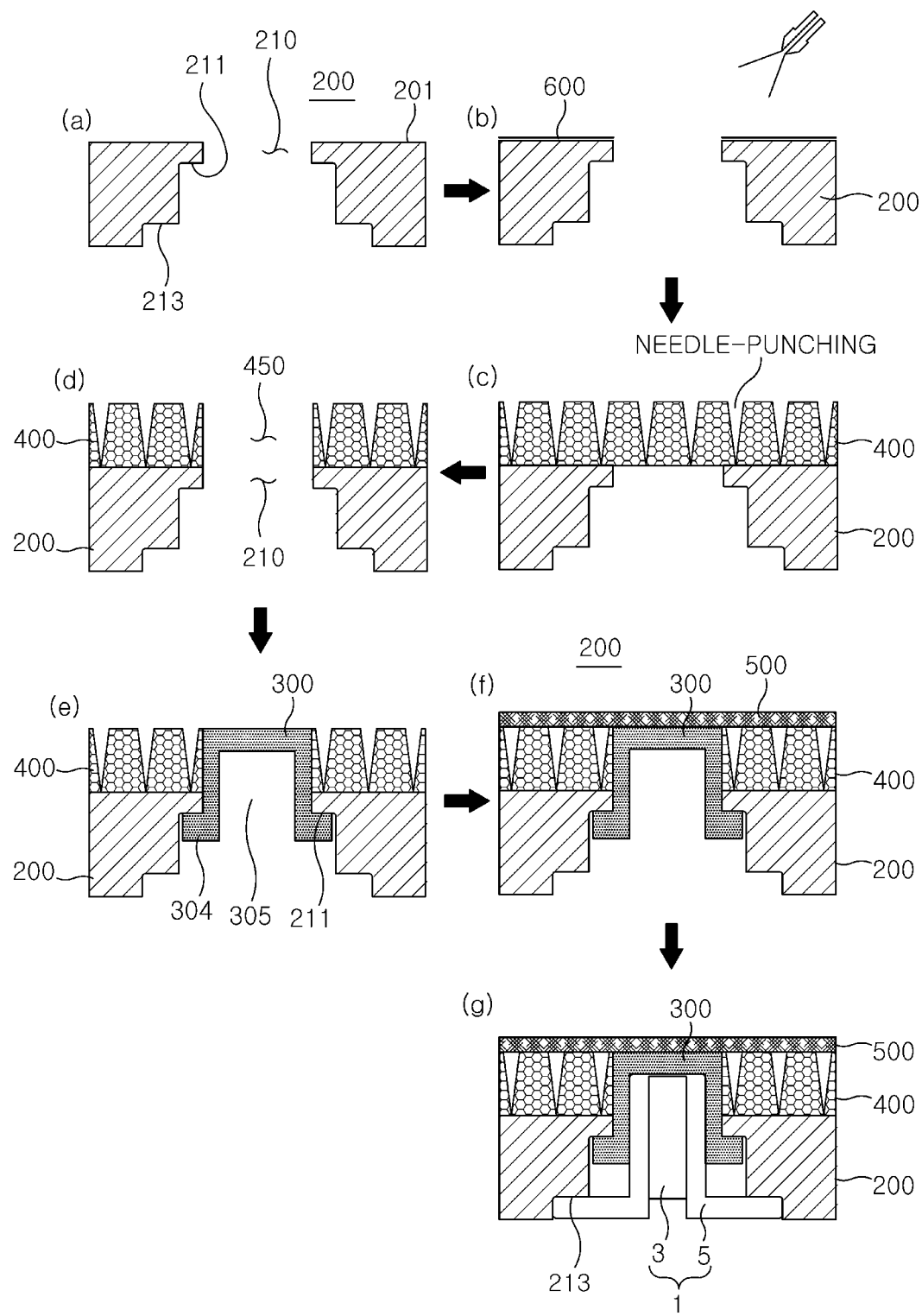
FIG. 4 is a set of sequence diagrams illustrating a method of manufacturing a soft upper trim for switch assembly for a vehicle door according to an exemplary embodiment of the present invention.
Figure 5:
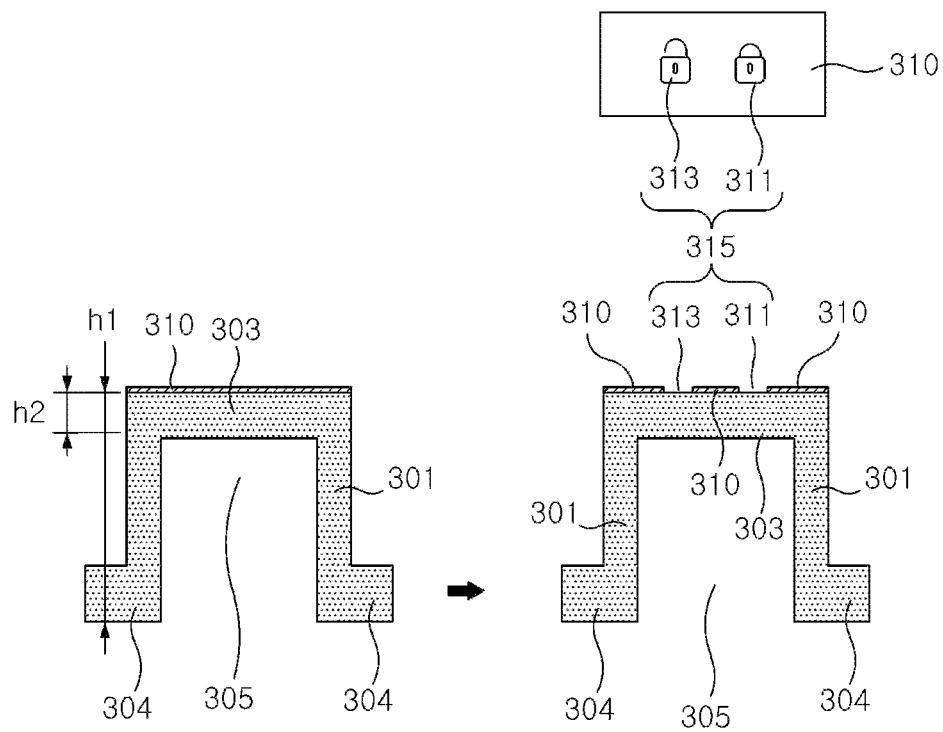
FIG. 5 is a set of sequence diagrams illustrating a process of engraving a symbol on a light guide panel of FIG. 4.
Figure 6:
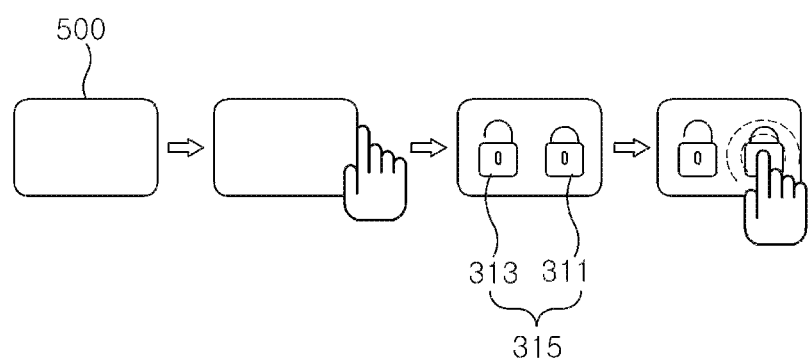
FIG. 6 is a set of operational sequence diagrams of a hidden switch.

FIG. 4 is a set of sequence diagrams illustrating a method of manufacturing a soft upper trim for switch assembly of a vehicle door according to an exemplary embodiment of the present invention. FIG. 5 is a set of sequence diagrams illustrating a process of engraving a symbol on a light guide panel of FIG. 4. FIG. 6 is a set of operational sequence diagrams of a hidden switch.

As illustrated in FIG. 4F, a soft upper trim 100 for switch assembly of a vehicle door according to the present embodiment includes an upper substrate 200 on which a switch module 1 is disposed, a light guide plate 300 assembled to the upper substrate 200 and a porous foam 400, and a transparent skin 500 press-attached to upper surfaces of the porous foam 400 and the light guide plate 300.

The upper substrate 200 is an injection-molded product made of polypropylene (PP).

As illustrated in FIG. 4A, a first through-hole 210 is formed in the upper substrate 200 along a vertical center line thereof. A first latch stepped portion 211 and a second latch stepped portion 213 are formed around the first through-hole 210 of the upper substrate 200 at a middle side and a lower side of the upper substrate 200, and the light guide plate 300 is caught on the first latch stepped portion 211 and the switch module 1 is caught on the second latch stepped portion 213.

The first through-hole 210 becomes a space in which the switch module 1 is disposed as illustrated in FIG. 4G.

As illustrated in FIG. 4B, an adhesive 600 is applied on an upper surface 201 of the upper substrate 200 which is injection-molded to have such a shape. As illustrated in FIG. 4C, the porous foam 400 is placed on the upper surface 201 and is vacuum-pressed to laminate the porous foam 400 and the upper substrate 200 in a vacuum mold.

Since an upper mold of the vacuum mold has no embossed portion and air-permeability and a lower mold thereof has air-permeability, the vacuum mold uses a method in which vacuum suction is performed through the lower mold to perform a vacuum press.

The porous foam 400 is made of a PP or polyphenol oxidase (PPO) material and is foam which is formed so as to have porosity by needle-punching a foam which is foam-extruded in advance.

The needle punching is performed to solve the following problem: in a case in which the foam 400 is not permeable to air, when the transparent skin 500 to be described below is laminated on the foam 400 and the substrate 200 after the foam 400 and the substrate 200 are laminated, air is likely to fill between the transparent skin 500 and the foam 400 during in-mold grain (IMG) molding.

After the porous foam 400 is laminated on the upper substrate 200, as illustrated in FIG. 4D, a second through-hole 450, into which the light guide plate 300 is inserted, is cut.

The second through-hole 450 is formed at a position which vertically communicates with the first through-hole 210.

When the second through-hole 450 is formed as described above, the light guide plate 300 is inserted into the second through-hole 450 through the first through-hole 210 as shown in FIG. 4E.

In this case, the light guide plate 300 is inserted such that an upper surface of the light guide plate 300 is placed at the same level and on the same line as an upper surface of the porous foam 400. When the light guide plate 300 is inserted until a flange 304 of the light guide plate 300 is caught on the first latch stepped portion 211, the upper surface of the light guide plate 300 is automatically adjusted.

The light guide plate 300 is a material affiliated to engineering plastic such as polycarbonate (PC) and functions to diffuse light of a light-emitting diode (LED (not shown)) of a switch device 3 in the switch module 1.

As illustrated in FIG. 5, after an opaque paint 310 is applied as masking on the upper surface of the light guide plate 300, patterns corresponding to a lock symbol 311 and an unlock symbol 313 are formed by cutting and removing the opaque paint 310 using a laser. A film, on which symbols 315 are formed, may be attached instead of the masking.

Therefore, when light is emitted through the light guide plate 300, the light may pass through only the lock and unlock symbols 311 and 313. Accordingly, a driver may view the lock/unlock symbols 311 and 313.

As illustrated in FIG. 5, the light guide plate 300 includes side plates 301, an upper plate 303 which connects upper surfaces of the side plates 301 and has the symbols 311 and 313 engraved therein, and flanges 304 formed at lower sides of the side plates 301. An accommodation groove 305, in which an upper side of the switch module 1 is inserted and accommodated, is further formed inside a lower side of the light guide plate 300.

Therefore, since a thickness h2 of the upper plate 303 is less than a thickness h1 of the light guide plate 300, light may be more clearly diffused and pass through the upper plate 303.

In addition, since the upper side of the switch module 1 is accommodated and assembled in the accommodation groove 305 as illustrated in FIG. 4G, the fixing of the switch module 1 is much better.

Since the switch module 1 is inserted until a bezel 5 of the switch module 1 is caught on the second latch stepped portion 213, the light guide plate 300 is not pressed upward excessively As illustrated in FIG. 4F, the transparent skin 500 is vacuum-pressed on the upper surfaces of the porous foam 400 and the light guide plate 300 in an IMG mold.

A hot-melt adhesive is applied on a lower surface of the transparent skin 500.

The transparent skin 500 is press-attached through IMG molding, which is a vertical vacuum suction press molding.

Since an upper mold and a lower mold of the IMG mold have an embossed portion engraved therein and the lower mold has air-permeability, the embossed portion is naturally transferred onto a non-textured skin so as to be viewed like a leather pattern during a molding process.

The transparent skin 500 may be a thermoplastic olefin (TPO) fabric having a thickness of 0.5 mm to 1.0 mm or a thickness of 1.0 mm or more and a transmittance of about 10% to 15%.

The TPO fabric is a material which is widely used as an interior material of a vehicle.

The switch module 1 includes a switch device 3 which includes lock and unlock-corresponding LEDs, a printed circuit board (PCB), and the like, and the bezel 5 on which the switch device 3 is mounted.

A method of manufacturing the above-described soft upper trim 100 for switch assembly of a vehicle door will be described with reference to FIG. 4.

As illustrated in FIG. 4A, an upper substrate 200, in which a first through-hole 210 is formed, is injection-molded, wherein a switch module 1 is disposed in the first through-hole 210.

As illustrated in FIG. 4B, an adhesive 600 is applied on an upper surface 201 of the injection-molded upper substrate 200.

After the adhesive 600 is applied, as illustrated in FIG. 4B, a needle-punched porous foam 400 is placed on the upper surface 201 of the upper substrate 200 and is vacuum-pressed in a vacuum mold.

As illustrated in FIG. 4D, a second through-hole 450 is cut in the porous foam 400 press-attached to the upper surface 201 of the upper substrate 200.

As illustrated in FIG. 4E, after the second though-hole 450 is cut, a light guide plate 300 is inserted into the second through-hole 450 through the first through-hole 210. The light guide plate 300 is inserted such that an upper surface of the light guide plate 300 is placed at the same level as an upper surface of the porous foam 400.

After the light guide plate 300 is inserted into the second though-hole 450, as illustrated in FIG. 4F, a transparent skin 500 having a lower surface applied with an adhesive is placed and is vacuum-suctioned and pressed in an IMG mold.

As illustrated in FIG. 4F, a switch module 1 is assembled to the soft upper trim 100 for switch assembly of a vehicle door as manufactured above.

The soft upper trim assembled with the switch module 1 is coupled to a center trim, and a lower trim and is assembled and used as a final interior material of a vehicle door.

Accordingly, as illustrated in FIG. 6, when a driver's hand approaches within 15 mm of the transparent skin 500 at a position where the hidden switch module 1 is assembled, a proximity sensor senses the hand and irradiates light of the LED to display only the lock/unlock symbols 315 on the transparent skin 500.

When a desired symbol is touched among the displayed lock/unlock symbols 315, light of an undesired symbol is turned off, and the desired symbol is turned off after a few seconds, operation of the switch module 1 is ended.

To turn off the symbols 315, a light irradiation time of the LED may be set.

On the other hand, instead of ejecting and applying the adhesive 600 of FIG. 4B on the upper surface 201 of the upper substrate 200, the porous foam 400 having a lower surface pre-applied with an adhesive such as a hot-melt adhesive may be vacuum-pressed to the upper surface 201 of the upper substrate 200.

In addition, although it has been described that the symbols 315 are lock/unlock patterns, the symbols 315 may also include an operating symbol for performing functions inside a vehicle or an illumination symbol on which a lighting pattern for LED mood lighting is formed.

While the exemplary embodiments of the present invention are susceptible to various modifications and alternative forms, specific exemplary embodiments thereof are shown byway of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The invention claimed is:

1. A method of manufacturing a soft upper trim for switch assembly of a vehicle door, the method comprising:
    (a) injection-molding an upper substrate in which a first through-hole is formed, wherein a switch module is disposed in the first through-hole;
    (b) applying an adhesive on an upper surface of the upper substrate;
    (c) vacuum-pressing a porous foam which is needle-punched on the upper surface of the upper substrate, on which the adhesive is applied;
    (d) cutting the porous foam corresponding to the first through-hole to form a second through-hole into which a light guide plate is inserted, wherein the light guide plate has an upper surface in which a symbol is engraved and a lower surface to which the switch module is assembled;
    (e) disposing the light guide to be inserted into the second through-hole through the first through-hole, wherein an upper surface of the porous foam is disposed at the same level as an upper surface of the light guide plate; and
    (f) vacuum-pressing a transparent skin on the upper surface of the porous foam and the upper surface of the light guide plate in an in-mold grain mold, wherein the transparent skin has a lower surface applied with an adhesive.

2. A method of manufacturing a soft upper trim for switch assembly of a vehicle door, the method comprising:
    (a) injection-molding an upper substrate in which a first through-hole is formed, wherein a switch module is disposed in the first through-hole;
    (b) vacuum-pressing a porous foam on an upper surface of the upper substrate in a vacuum mold, wherein the porous foam is needle-punched and has a lower surface applied with an adhesive;
    (c) cutting the porous foam corresponding to the first through-hole to form a second through-hole into which a light guide plate is inserted, wherein the light guide plate has an upper surface in which a symbol is engraved and a lower surface to which the switch module is assembled;
    (d) disposing the light guide plate to be inserted into the second through-hole through the first through-hole, wherein an upper surface of the porous foam is disposed at the same level as an upper surface of the light guide plate; and
    (e) vacuum-pressing a transparent skin on the upper surface of the porous foam and the upper surface of the light guide plate in an in-mold grain mold, wherein the transparent skin has a lower surface applied with an adhesive.

3. A soft upper trim for switch assembly of a vehicle door, the soft upper trim in which an upper substrate, a foam, and a transparent skin are laminated,
    wherein the upper substrate has a first through-hole vertically formed therein, in which a switch module is disposed;
    the foam is a needle-punched porous foam and has a second through-hole formed in a position corresponding to the first through-hole;
    a light guide plate is inserted into the second through-hole, wherein a symbol is engraved in an upper surface of the light guide plate and an upper surface of the porous foam is disposed at the same level as the upper surface of the light guide plate; and
    the transparent skin is attached to the upper surface of the porous foam and the upper surface of the light guide plate, and
    wherein the light guide plate includes side plates, an upper plate which connects upper surfaces of the side plates and has the symbol engraved therein, and flanges which are formed at lower sides of the side plates and are caught on a latch stepped portion of the first through-hole; and
    an accommodation groove, in which the switch module is inserted and accommodated, is formed inside a lower side of the light guide plate.

* * * * *